(12) United States Patent
King

(10) Patent No.: US 9,055,429 B2
(45) Date of Patent: Jun. 9, 2015

(54) GROUP SUBSCRIBER NUMBER MANAGEMENT SYSTEM FOR A GROUP MESSAGING SERVICE

(71) Applicant: BRITISH TELECOMMUNICATIONS public limited company, London (GB)

(72) Inventor: Stuart L. King, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 272 days.

(21) Appl. No.: 13/741,727

(22) Filed: Jan. 15, 2013

(65) Prior Publication Data

US 2014/0200043 A1    Jul. 17, 2014

(51) Int. Cl.
| | |
|---|---|
| H04B 7/00 | (2006.01) |
| H04W 8/26 | (2009.01) |
| H04L 12/58 | (2006.01) |
| H04L 29/12 | (2006.01) |
| H04W 4/08 | (2009.01) |
| H04W 4/06 | (2009.01) |

(52) U.S. Cl.
CPC ............... *H04W 8/26* (2013.01); *H04L 51/38* (2013.01); *H04L 61/2069* (2013.01); *H04L 61/6004* (2013.01); *H04W 4/06* (2013.01); *H04W 4/08* (2013.01); *H04L 51/14* (2013.01)

(58) Field of Classification Search
CPC .......... H04W 8/26; H04W 4/06; H04W 4/08; H04L 51/14; H04L 51/38; H04L 61/2069; H04L 61/6004

USPC .......................................... 455/466, 518, 519
See application file for complete search history.

(56) References Cited

U.S. PATENT DOCUMENTS

| | | | |
|---|---|---|---|
| 5,923,733 A | 7/1999 | Binns et al. | |
| 7,043,264 B2 | 5/2006 | Vance, Jr. et al. | |
| 7,706,817 B2 | 4/2010 | Bamrah et al. | |
| 7,865,199 B2 | 1/2011 | Noldus | |
| 8,130,917 B2 | 3/2012 | Helbling et al. | |
| 2003/0097466 A1* | 5/2003 | Sung ............................. | 709/238 |
| 2006/0250987 A1 | 11/2006 | White et al. | |
| 2007/0115925 A1 | 5/2007 | Sachnoff | |

(Continued)

FOREIGN PATENT DOCUMENTS

| | | |
|---|---|---|
| EP | 0 333 615 A2 | 9/1989 |
| EP | 1 164 774 A1 | 12/2001 |

(Continued)

OTHER PUBLICATIONS

Invitation to Pay Additional Fees and, Where Applicable, Protest Fee including Communication Relating to the Results of the Partial International Search mailed Apr. 7, 2014 in International Application No. PCT/GB2014/000011 (5 pages).

(Continued)

*Primary Examiner* — Raymond Dean
(74) *Attorney, Agent, or Firm* — Nixon & Vanderhye P.C.

(57) ABSTRACT

A method for managing group subscriber numbers in a group messaging device reduces the required number of group subscriber numbers used by the messaging service. The required number of group subscriber numbers is equal to the total number of groups in which a user is permitted to be a member and not the total number of groups of users in the system.

20 Claims, 4 Drawing Sheets

(56) References Cited

U.S. PATENT DOCUMENTS

| | | |
|---|---|---|
| 2007/0117578 A1 | 5/2007 | Yim et al. |
| 2009/0061825 A1 | 3/2009 | Neelakantan et al. |
| 2009/0164587 A1 | 6/2009 | Gavita et al. |
| 2010/0087173 A1 | 4/2010 | Lin et al. |
| 2010/0136980 A1 | 6/2010 | Linquist et al. |
| 2011/0045851 A1 | 2/2011 | Maddox et al. |
| 2013/0066987 A1 | 3/2013 | Levinson et al. |
| 2013/0115921 A1 | 5/2013 | Szesztay et al. |

FOREIGN PATENT DOCUMENTS

| | | |
|---|---|---|
| EP | 1 608 190 B1 | 2/2009 |
| WO | WO 02/060199 A1 | 8/2002 |

OTHER PUBLICATIONS https://groupme.com/, "The best way to chat with everyone you know," 6 pages, copyright 2012 GroupMe Inc.

Written Opinion of the International Preliminary Examining Authority issued in International Application No. PCT/GB2014/000011 dated Feb. 4, 2015.

International Search Report issued in International Application No. PCT/GB2014/000011 dated Jun. 11, 2014.

Written Opinion of the International Searching Authority issued in International Application No. PCT/GB2014/000011 dated Jun. 11, 2014.

* cited by examiner

Users

| User Id | Name | Subscriber Phone Number |
|---|---|---|
| 1 | Alice | (650) 555 0001 |
| 2 | Bob | (650) 555 0002 |
| 3 | Charlie | (650) 555 0003 |
| 4 | David | (650) 555 0004 |

SMS Subscriber Number Pool

| User Id | Group Subscriber Number |
|---|---|
| 1 | (408) 555 0001 |
| 2 | (408) 555 0002 |
| 3 | (408) 555 0003 |

Groups

| Group Id | Unique Internal System Group Name | User Id | SMS Pool Group Subscriber Number |
|---|---|---|---|
| 1 | Group One | 1 (Alice) | 1 (408) 555 0001 |
|  |  | 2 (Bob) | 2 (408) 555 0001 |
|  |  | 3 (Charlie) | 3 (408) 555 0001 |
| 2 | Group Two | 3 (Charlie) | 2 (408) 555 0002 |
|  |  | 2 (Bob) | 2 (408) 555 0002 |
|  |  | 4 (David) | 1 (408) 555 0001 |
| 3 | Group Three | 1 (Alice) | 2 (408) 555 0002 |
|  |  | 2 (Bob) | 3 (408) 555 0003 |
|  |  | 4 (David) | 2 (408) 555 0002 |

FIG. 4

GROUP SUBSCRIBER NUMBER MANAGEMENT SYSTEM FOR A GROUP MESSAGING SERVICE

TECHNICAL FIELD

The technology herein relates to a method and apparatus for managing group subscriber numbers in a group messaging service. In more detail, the technology herein relates to assigning a unique identifier (e.g., an internal system number) to each user group while using and reusing only a small number of group subscriber numbers.

BACKGROUND AND SUMMARY

Short Message Service (SMS) is used by messaging services to communicate to wireless devices. For example, wireless carriers provide SMS to their cell phone customers for text messaging.

SMS is used for sending and receiving text messages between a messaging service and a mobile device. The messages are limited in length and cannot be longer than 160 characters or contain images or graphics.

Typically, SMS is used for one-to-one messaging. In this instance, each user is assigned a unique subscriber number that other users can use to send a message to the owner of that subscriber number. Users can also send messages to multiple other users by specifying a plurality of subscriber numbers to send a message. Then, multiple messages are sent from the user's device. In order for the recipient of one of these messages to reply, he/she also may have to send a message multiple times, one for each recipient. Since there is a cost associated with each message sent, sending multiple copies of the same message, when sending to a group of users, can be costly and inefficient to the user.

As a result of this, a number of group messaging services have been created. By using a group messaging service, a user no longer has to send copies of the same message to each member of a group of other users, but only send one message to a central group subscriber number owned by the service provider. When the service provider receives a message from a user subscriber number associated with a user to a group subscriber number, the service provider will then send out a copy of this message to each member of the group which is the desired destination of the message from the user. Creating groups and managing them is often done either through text based commands sent to the service provider via SMS or through an interactive user portal accessible via a web browser or mobile application.

The use of a group messaging service to send the message received from a user to multiple groups of users removes the inefficiency and cost from the user, however it passes these disadvantages to the service provider instead. One large cost incurred by the service provider is due to required maintenance of group subscriber numbers. Typically, the service provider will assign a unique group subscriber number for each group that exists in its system. The users, of course, already have each been assigned a unique subscriber number by their service provider (e.g., AT&T, Verizon, etc.). This way, when the service provider receives a message to that group subscriber number, it knows to which group that message is being directed and can forward the message to the associated members of that group. This results in the service provider requiring a subscriber number per group, which leads to an ever increasing rise in costs as the service grows and ever more users define even more groups.

For example, one popular group messaging service which does this is GroupMe. GroupMe's service informs the user that there is a unique group subscriber number dedicated to a user-defined group and what that new group subscriber number is (which can then be shared to other users).

However, a service assigning one group subscriber number per group requires possibly a very large pool of subscriber numbers to be maintained. For example, for a service that has 100,000 users, even if each user were to create just one group, then this would still require 100,000 individual group subscriber numbers. It is noted that in a conventional system, the assignment is for one subscriber number per group, not one subscriber number per user per group.

Therefore, it would be beneficial if a method allowed a group messaging service to operate using only a small fixed pool of group subscriber numbers, yet still appear to provide a single subscriber number-per-group concept to the end user for a theoretically limitless number of users.

In one exemplary illustrative non-limiting implementation, a much smaller pool of group subscriber numbers is required for the group messaging service, the number of which is not determined by the number of users or groups that are created. Instead, the size of the group subscriber number pool is equal to the number of separate groups of which any single user is permitted to become a member. For example, if the service allows a single user to be a member of only 10 groups at once, then only 10 group subscriber numbers are required for the entire system. The total number of users on the service is now irrelevant (insofar as maintenance of group subscriber numbers is concerned), as the service having only 10 group subscriber numbers would work equally well with 100 users, 100,000 users or 1,000,000 users. Even if a user were permitted to be part of as many as 100 groups at once (which would be heavy usage for a group messaging service), it would still require only 100 group subscriber numbers, a lot less than a large scale service using a separate unique subscriber number per group. By using significantly fewer group subscriber numbers, the management of subscriber numbers in, e.g., an SMS group messaging service, an ever increasing variable cost to the SMS business is reduced into a much smaller fixed cost.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 4 depicts an example of simplified data files for a messaging provider system using only a small pool of SMS subscriber numbers.

DETAILED DESCRIPTION

Techniques described herein can be performed using any type of a mobile device including, a portable personal computer, a mobile phone, or any other type of device or arrangement having transmission and reception of message capabilities. One exemplary illustrative non-limiting implementation is described below, but other implementations are possible.

Figure 1:
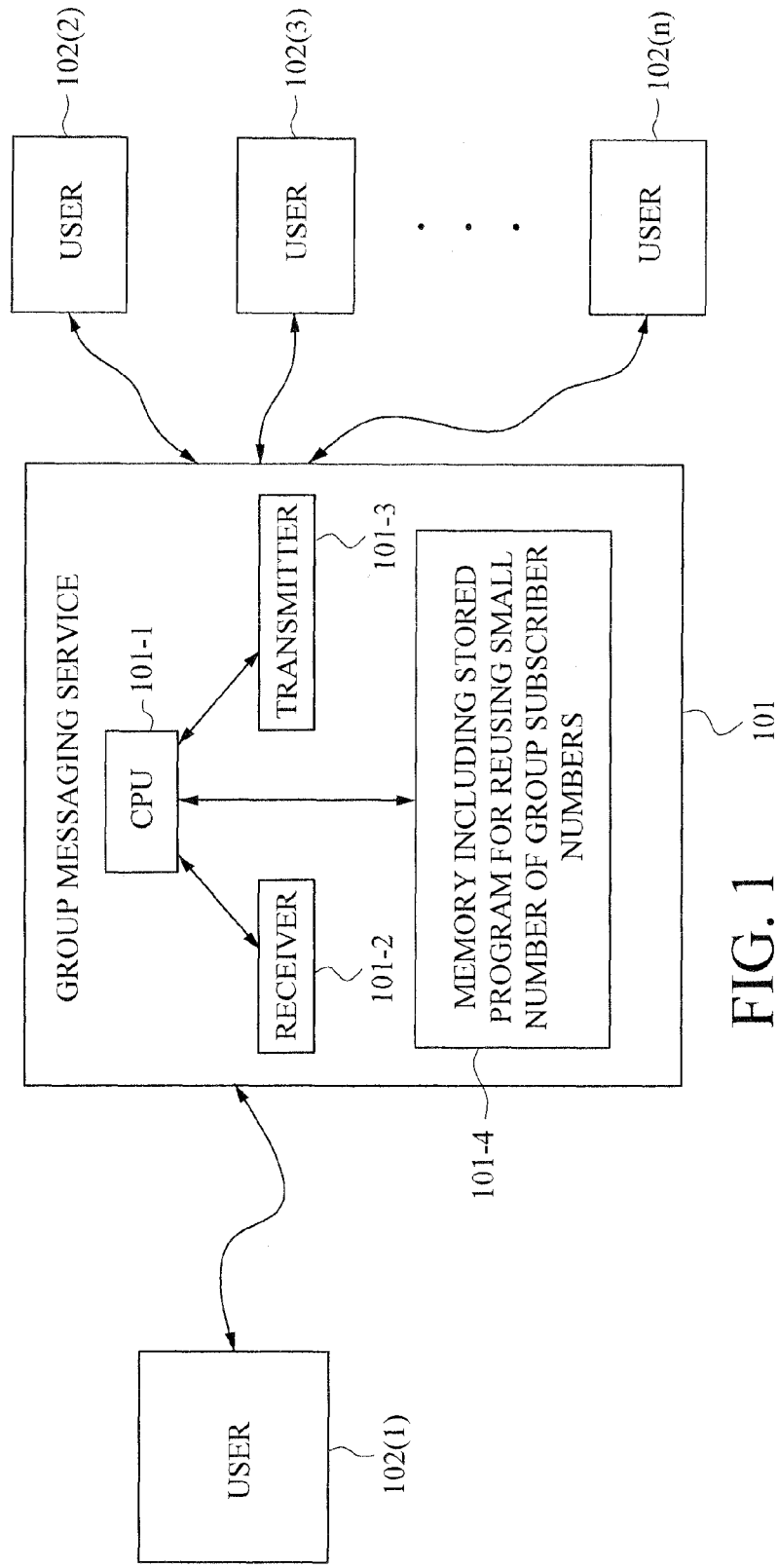
FIG. 1 schematically shows an exemplary group messaging service configuration (e.g., supporting Short Message Service (SMS)).

FIG. 1 shows a typical system used for sending and receiving messages between a group messaging service 101 and mobile devices 102(1), 102(2) ... 102(n). The group messaging service 101 receives and transmits messages from and to member clients 102(1), 102(2) ... 102(n). The group messaging service 101 comprises at least one CPU 101-1, a receiver 101-2, a transmitter 101-3 and a memory 101-4.

In a non-limiting exemplary embodiment, a unique hash is assigned per user, per group (e.g., a simple concatenation of the user subscriber number and one of the small pool of group subscriber numbers), instead of a unique subscriber number being assigned per group. The hash is a combination of a group subscriber number owned by the service and the user's own individual subscriber number. When the service receives a message for a group from a user, it can look at both the origin subscriber number (belonging to the user) and the destination group subscriber number (belonging to the service), and combine these two together to determine a unique internal system group identifier (which is not a subscriber number) and thus the destination group for this message.

The service's group subscriber numbers are managed using a simple list, stored in memory 101-4, where each group subscriber number is assigned an index from 1 to X, with X being the total number of group subscriber numbers in the pool. When a user is added to a group (either by themselves when creating a group, or being added to a group by another user), he/she is assigned a group subscriber number matching the index of the number of groups they are now a member of. For example, if group A is the first group a user is becoming a member of, then for this group A, the user is assigned the group subscriber number index of 1. The user's hash for this group then comprises the combination (e.g., concatenation) of his/her own individual subscriber number, and the group subscriber number index 1 which now uniquely identifies the user and group. In addition, a unique internal system group identifier (e.g., a number) is assigned to each group so that other members of each group can be located when a group includes different group subscriber number indices.

For a second group the user has joined, he/she gets assigned the group subscriber number index of 2, and so on. As a result, the total of the pool of group subscriber numbers reflects the total number of groups a user can be a member of. It is noted that all users use the same pool of group subscriber numbers, since the combination of the user's own individual subscriber number with the group subscriber number from the pool can uniquely identify the user and group (because these two subscriber numbers point to a unique internal system group identifier that will identify all members of the group even if some members have been assigned a different group subscriber number form the pool).

A user will also receive all messages associated with that group from the group subscriber number they are assigned. This way, the users are made aware of what this group subscriber number is and they simply have to reply to the last message they received.

To help explain further, a simple example implementation is illustrated in FIG. 4 and further explained below.

An example group subscriber number pool at the service may consist of:
1: 4085550001
2: 4085550002
3: 4085550003

An example list of users and their unique user subscriber numbers may consist of:
Alice: 6505550001
Bob: 6505550002
Charlie: 6505550003
David: 6505550004

First, Alice creates a 'Group 1' with Bob and Charlie. For all these users, this is the first group they are part of in the system, so they all get assigned the 1st group subscriber number from the pool, 4085550001. The members of 'Group 1' and their respective hash numbers are then:
Alice: 4085550001 6505550001
Bob: 4085550001 6505550002
Charlie: 4085550001 6505550003

When Alice sends an SMS to the group subscriber number 4085550001, the system will get the origin number '6505550001' (belonging to Alice), combine it with the destination subscriber number '4085550001' and then determine that it matches the association of Alice with 'Group 1'. When the system forwards that message on to Bob and Charlie, they will both see that it is from 4085550001 (i.e., the group associated with Alice, Bob and Charlie).

Now, Charlie creates 'Group 2' with Bob and David. For Charlie and Bob, this is the second group they are part of, so they are assigned the 2nd group subscriber number in the pool. However, it is David's first group, so he gets assigned the 1st group subscriber number in the pool. Thus, the hash numbers of the members of Group 2 look like:
Charlie: 4085550002 6505550003
Bob: 4085550002 6505550002
David: 4085550001 6505550004

When Charlie sends an SMS to the group subscriber number 4085550002, the system will identify this message belonging to 'Group 2'. Likewise, when David sends an SMS to the group subscriber number 4085550001, the system will identify the message also belonging to 'Group 2'. Messages sent to Charlie and Bob will be from the group subscriber number 4085550002 and messages sent to David will be from 4085550001. Of course, each of the Charlie, Bob and David hash numbers will be assigned the same unique internal system identifier so they can all be associated with a common group even though different group subscriber numbers are included in the group.

The above demonstrates that there is no longer a dedicated group subscriber number per group. Also, for each group to which a user is added, the system just picks the next group subscriber number in the pool list. As a result, the size of the pool determines the number of groups a single user can be a member of, as opposed to the total number of groups in the entire system. Of course, the system will maintain its own internal set of unique group numbers, one for each of the total number of groups in the system.

As a side note, if David were to send a message to 4085550002 (which would be unlikely as he wouldn't be aware of this number's existence since no message has been sent to him from this number), the system would not find a matching group so the message would be ignored.

Figure 2:
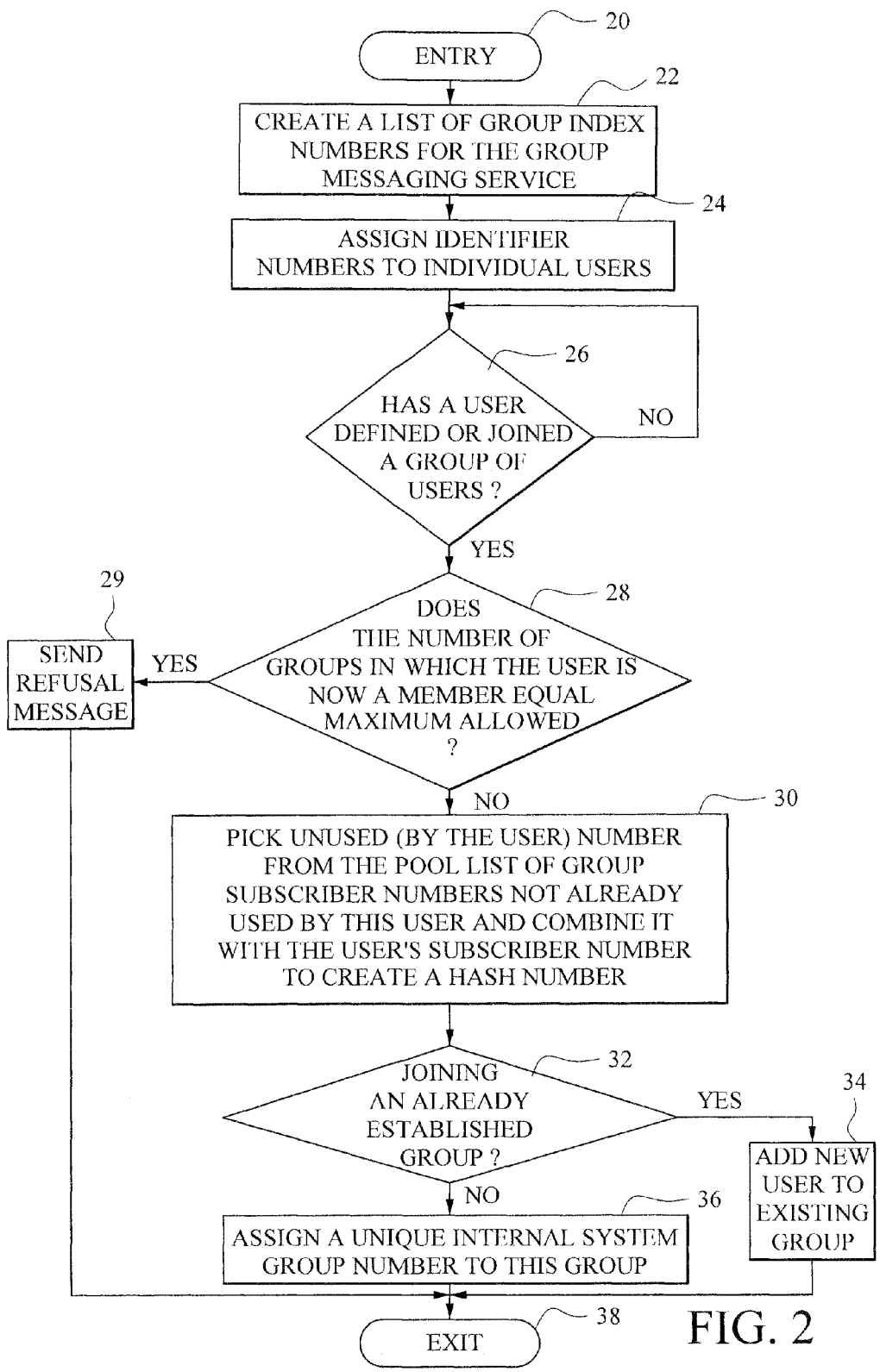
FIG. 2 shows an exemplary illustrative non-limiting computer program code structure flowchart for the FIG. 1 stored program configured to reuse a small number of group subscriber numbers.

FIG. 2 shows a flowchart of an exemplary illustrative non-limiting computer program code structure which, when executed by a CPU 101-1 of the group messaging service 101, effects a process for assigning a limited pool of group subscriber numbers in an SMS group messaging service. First, the messaging service creates a list of index numbers representing the number of groups in which a user can be a member at step 22. Next, in step 24, the messaging service assigns a user subscriber number to its member users. As those in the art will appreciate, steps 22 and 24 will typically have been accomplished earlier in suitable set-up subscription sub-routines. Thus, entry 20 to the sub-routine of FIG. 2 will typically omit steps 22 and 24.

In step 26 (which may be entered upon an interrupt or called program condition), the service determines whether a user has defined or joined a group of other users. If the answer is negative, then the process goes back to step 26 (or exits until the next interrupt or called program condition—at least after a timed interval). If the answer is positive, then the service determines the number of groups in which the user is already a member (step 28). If already at the maximum permitted, then a suitable refusal message will be outputted to the user at 29 and the routine exits at 38. However, if the maximum has not been exceeded, then the service picks a group subscriber number from the pool list not yet used by this user and combines it with the user's subscriber number to assign a hash number to this user member of the group together with similar hash numbers of other members of the group (step 30), see, for example, the hash numbers assigned to the respective members of 'Group 1' in the example implementation recited above. It then checks, in step 32, whether the user is joining an already established group. If so, then at step 34 the new user is added to an existing group. If not so, then at step 36 a new unique internal system group number is assigned to the new group and then the assigning process is exited at 38.

Figure 3:
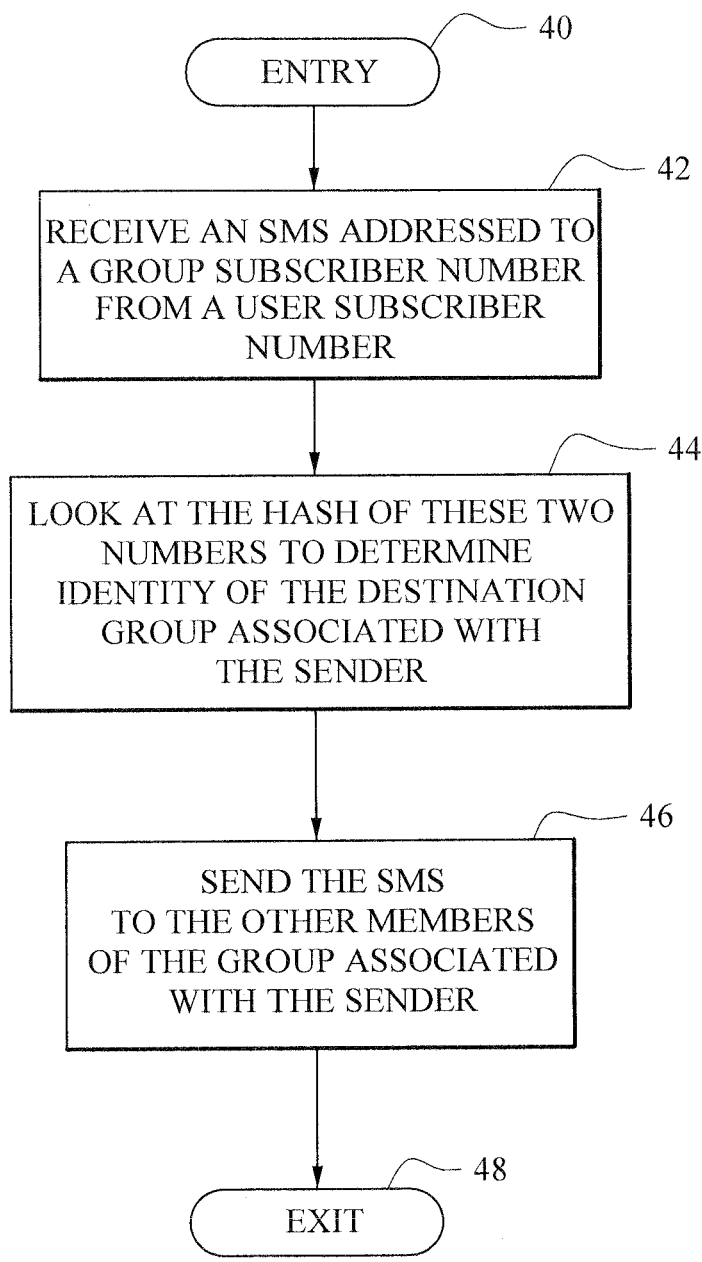
FIG. 3 shows another exemplary illustrative non-limiting computer program code structure flowchart for implementing the sending of group messages in the system of FIG. 1.

FIG. 3 shows a flowchart of an exemplary illustrative non-limiting computer program code structure which, when executed by a CPU of the group messaging service 101, effects receiving and transmitting of SMS messages in an SMS group messaging service. First, after entry to this sub-routine at step 40, the group messaging service receives an SMS message from a user subscriber number addressed to a group subscriber service at step 42. The service then looks at the corresponding hash number and determines the identity of the destination group that is associated with that hash number at 44. Next, in step 46, the service sends the received SMS message to the users which are members of the destination group as identified in step 44, and the process is exited at 48.

This unique way of managing group subscriber numbers in an SMS group messaging service significantly reduces the total number of group subscriber numbers needed, and turns the required number into a fixed smaller number and therefore reduces a cost that would otherwise increase indefinitely with the popularity of the service.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A computer-implemented method for assigning group subscriber numbers in a group messaging service, the method comprising:
   configuring at least one central processing unit (CPU) of the group messaging service to:
   each time a user defines or joins a new group of users, assign a hash number to the group, said hash number comprising a combination of the user's subscriber number and one of a predetermined fixed pool of group subscriber numbers together with similar hash numbers of other members of the group and in association with an internal unique system group number for this group.

2. The computer-implemented method according to claim 1, wherein said at least one CPU is configured to:
   maintain the pool of group subscriber numbers, wherein the total of group subscriber numbers in the pool is equal to the total number of groups to which a user is permitted membership.

3. The computer-implemented method according to claim 2, wherein said at least one CPU is configured to:
   every time a user defines or joins a new group, the group messaging service assigns to the user a group subscriber number in the pool not currently being used by the user.

4. The computer-implemented method according to claim 1, wherein said at least one CPU is configured to:
   assign a new unique system group number for each newly defined group but not when a user merely joins an already existing group.

5. The computer-implemented method according to claim 1, further comprising transmitting a message from a first user to a group of users belonging to the same group as the first user via the messaging service, the method further comprising:
   configuring said at least one CPU of the messaging service to:
   (a) receive a message from a user subscriber number to a group subscriber number;
   (b) associate a combination of said user and group subscriber numbers to determine other user subscriber numbers belonging to a same group; and
   (c) transmit the message to members of the group determined in step (b).

6. The computer-implemented method according to claim 5, wherein said at least one CPU is configured to:
   maintain a pool of group subscriber numbers, wherein the total of group subscriber numbers in the pool is equal to the total number of groups in which a user is permitted membership.

7. The computer-implemented method according to claim 6, wherein said at least one CPU is configured to:
   every time a user defines or joins a new group, the group messaging service assigns to the user a group subscriber number in the pool not currently being used by the user.

8. The computer-implemented method according to claim 7, wherein said at least one CPU is configured to:
   assign a new unique system group number for each newly defined group but not when a user merely joins an already existing group.

9. A computer-implemented method for transmitting a message from a first user to a group of users belonging to the same group as the first user via a messaging service, the method comprising:
   configuring at least one central processing unit (CPU) of the messaging service to:
   (a) receive a message from a user subscriber number to a group subscriber number;
   (b) associate a combination of said user and group subscriber numbers to determine other user subscriber numbers belonging to a same group; and
   (c) transmit the message to members of the group determined in step (b).

10. The computer-implemented method according to claim 9, wherein said at least one CPU is configured to:
    maintain a pool of group subscriber numbers, wherein the total of group subscriber numbers in the pool is equal to the total number of groups in which a user is permitted membership.

11. A system comprising at least one group messaging service facility including at least one processor configured to:
  each time a user defines or joins a new group of users, assign a hash number to the group, said hash number comprising a combination of the user's subscriber number and one of a predetermined fixed pool of group subscriber numbers together with similar hash numbers of other members of the group and in association with an internal unique system group number for this group.

12. The system according to claim 11, wherein said at least one processor is configured to:
  maintain the pool of group subscriber numbers, wherein the total of group subscriber numbers in the pool is equal to the total number of groups to which a user is permitted membership.

13. The system according to claim 12, wherein said at least one processor is configured to:
  every time a user defines or joins a new group, the group messaging service assigns to the user a group subscriber number in the pool not currently being used by the user.

14. The system according to claim 11, wherein said at least one processor is configured to:
  assign a new unique system group number for each newly defined group but not when a user merely joins an already existing group.

15. A system according to claim 11 wherein said at least one processor is configured to:
  (a) receive a message from a user subscriber number to a group subscriber number;
  (b) associate a combination of said user and group subscriber numbers to determine other user subscriber numbers belonging to a same group; and
  (c) transmit the message to members of the group determined in step (b).

16. The system according to claim 15, wherein said at least one processor is configured to:
  maintain a pool of group subscriber numbers, wherein the total of group subscriber numbers in the pool is equal to the total number of groups in which a user is permitted membership.

17. The system according to claim 16, wherein said at least one processor is configured to:
  every time a user defines or joins a new group, the group messaging service assigns to the user a group subscriber number in the pool not currently being used by the user.

18. The system according to claim 17, wherein said at least one processor is configured to:
  assign a new unique system group number for each newly defined group but not when a user merely joins an already existing group.

19. A system comprising at least one group messaging service facility including at least one processor configured to:
  (a) receive a message from a user subscriber number to a group subscriber number;
  (b) associate a combination of said user and group subscriber numbers to determine other user subscriber numbers belonging to a same group; and
  (c) transmit the message to members of the group determined in step (b).

20. The system according to claim 19, wherein said at least one processor is configured to:
  maintain a pool of group subscriber numbers, wherein the total of group subscriber numbers in the pool is equal to the total number of groups in which a user is permitted membership.

* * * * *